(12) United States Patent
Sahm

(10) Patent No.: US 12,059,638 B2
(45) Date of Patent: *Aug. 13, 2024

(54) IN-PIPE INSERTS FOR PIPING SYSTEMS AND RELATED METHODS

(71) Applicant: TPE MIDSTREAM LLC, Tulsa, OK (US)

(72) Inventor: Douglas A. Sahm, Lutz, FL (US)

(73) Assignee: TPE MIDSTREAM LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,352

(22) Filed: Jan. 13, 2023

(65) Prior Publication Data

US 2023/0143016 A1 May 11, 2023

Related U.S. Application Data

(63) Continuation of application No. 17/177,979, filed on Feb. 17, 2021, now Pat. No. 11,565,200.

(Continued)

(51) Int. Cl.
*B01D 29/13* (2006.01)
*F16L 55/24* (2006.01)

(52) U.S. Cl.
CPC ............. *B01D 29/13* (2013.01); *F16L 55/24* (2013.01); *B01D 2201/0415* (2013.01); *B01D 2201/4092* (2013.01)

(58) Field of Classification Search
CPC ............ B01D 29/13; B01D 2201/0415; B01D 2201/4092; B01D 29/15; B01D 29/21; B01D 29/54; B01D 35/02; F16L 55/24
See application file for complete search history.

(56) References Cited

U.S. PATENT DOCUMENTS 4,026,329 A 5/1977 Thompson
6,841,007 B1 1/2005 Howard et al.
(Continued)

FOREIGN PATENT DOCUMENTS

CA 2577034 A1 * 8/2008 ........... B01D 17/045
WO WO-2020260160 A1 * 12/2020 ......... B01D 46/0005

OTHER PUBLICATIONS

United States Patent and Trademark Office, "Non-Final Rejection", issued in connection with U.S. Appl. No. 17/177,979, filed Mar. 26, 2022, 15 pages.

(Continued)

*Primary Examiner* — Waqaas Ali
(74) *Attorney, Agent, or Firm* — HANLEY, FLIGHT & ZIMMERMAN, LLC

(57) ABSTRACT

In-pipe inserts for piping systems and related methods are described herein. An example filter insert includes an end plate having a set of openings, a set of filter tubes extending from a first side of the end plate, and a set of support rods extending through respective ones of the channels of the filter tubes. The support rods extend through the openings in the end plate. The filter insert also includes a first retainer disposed on a second side of the end plate. The first retainer is coupled to the support rods at or near first ends of the support rods. The filter insert further includes a second retainer coupled to the support rods at or near second ends of the support rods opposite the first ends such that the filter tubes are clamped between the end plate and the second retainer.

21 Claims, 12 Drawing Sheets

Related U.S. Application Data

(60) Provisional application No. 62/978,190, filed on Feb. 18, 2020.

(56) References Cited

U.S. PATENT DOCUMENTS

| | | |
|---|---|---|
| 7,500,834 B2 | 3/2009 | Durward |
| 7,993,517 B2 | 8/2011 | Lee |
| 8,197,611 B2 | 6/2012 | Stohmeier et al. |
| 9,976,686 B2 | 5/2018 | Sander et al. |
| 10,247,643 B1 | 4/2019 | Johnsen |
| 10,330,238 B2 | 6/2019 | Theener |
| 11,565,200 B2 | 1/2023 | Sahm |
| 2006/0108276 A1 | 5/2006 | Harms et al. |
| 2014/0151282 A1 | 6/2014 | Brown et al. |
| 2015/0343363 A1* | 12/2015 | Schlichter ............ B01D 46/003 55/323 |
| 2016/0200994 A1* | 7/2016 | Jiang ................ F02M 37/24 210/799 |
| 2016/0222931 A1* | 8/2016 | Jiang .................. B01D 35/153 |
| 2019/0209950 A1 | 7/2019 | Estachy |

OTHER PUBLICATIONS

United States Patent and Trademark Office, "Notice of Allowance and Fee(s) Due", issued in connection with U.S. Appl. No. 17/177,979, filed Sep. 14, 2022, 5 pages.

\* cited by examiner

IN-PIPE INSERTS FOR PIPING SYSTEMS AND RELATED METHODS

RELATED APPLICATIONS

This patent arises from a continuation of U.S. patent application Ser. No. 17/177,979 (now U.S. Pat. No. 11,565, 200), titled "IN-PIPE INSERTS FOR PIPING SYSTEMS AND RELATED METHODS," filed on Feb. 17, 2021, which claims the benefit under 35 U.S.C. § 119(e) to U.S. Provisional Application No. 62/978,190, titled "IN-PIPE INSERTS FOR PIPING SYSTEMS AND RELATED METHODS," filed Feb. 18, 2020. U.S. patent application Ser. No. 17/177,979 and U.S. Provisional Application No. 62/978,190 are hereby incorporated herein by reference in their entireties.

FIELD OF THE DISCLOSURE

This disclosure relates generally to piping systems and, more particularly, to in-pipe inserts for piping systems and related methods.

BACKGROUND

Piping systems are used in many industries to transport fluid between two or more locations. The locations may be relatively close, such as within a plant or factory, or relatively far, such as across a city, a state, or a country.

BRIEF DESCRIPTION OF THE DRAWINGS

In FIG. 1, the pipes of the example piping system are shown as transparent.

In FIG. 2, the pipes of the example piping system are shown as transparent.

In FIG. 3, the pipes of the example piping system are shown as transparent.

In FIG. 12, the pipes of the example piping system are shown as transparent.

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Pipelines or piping systems include one or more pipes to distribute and/or otherwise transfer fluid between two or more locations. Piping systems are used throughout the U.S. to distribute certain fluids, such as natural gas, water, etc. Piping systems are also used in industrial and manufacturing facilities. Filters and other devices are often connected to a pipe or between two pipes in the piping system to perform a particular function. For example, a filter may be externally coupled to a pipe or between two pipes to help remove contaminates and other unwanted particulate from the fluid. These known filters are disposed within casings that are constructed of relatively thick, robust material to withstand the relatively large pressures in the piping system. As a result, these known filters are heavy and costly to manufacture and install.

Disclosed herein are example in-pipe inserts, such as filter inserts, that can be disposed (e.g., placed, positioned, removably positioned, etc.) within a pipe of a piping system. The inserts may also be referred to as pipe-in-process inserts. The pipes of the piping system are constructed to withstand the pressures of the fluid. The example inserts and techniques disclosed herein leverage this existing structure. As such, the example inserts and techniques disclosed herein do not require the manufacture of large casings or require complicated installations. Instead, the example inserts can be easily inserted into a section of the pipe. In some examples, an insert can be disposed in a pig launcher or receiver barrel used to launch and/or receive pigs. Pigs are pipeline inspection gauges or pipeline intervention devices, commonly referred to as pigs, PIGs, or scrapers. Pigs can be used for various functions.

Figure 1:
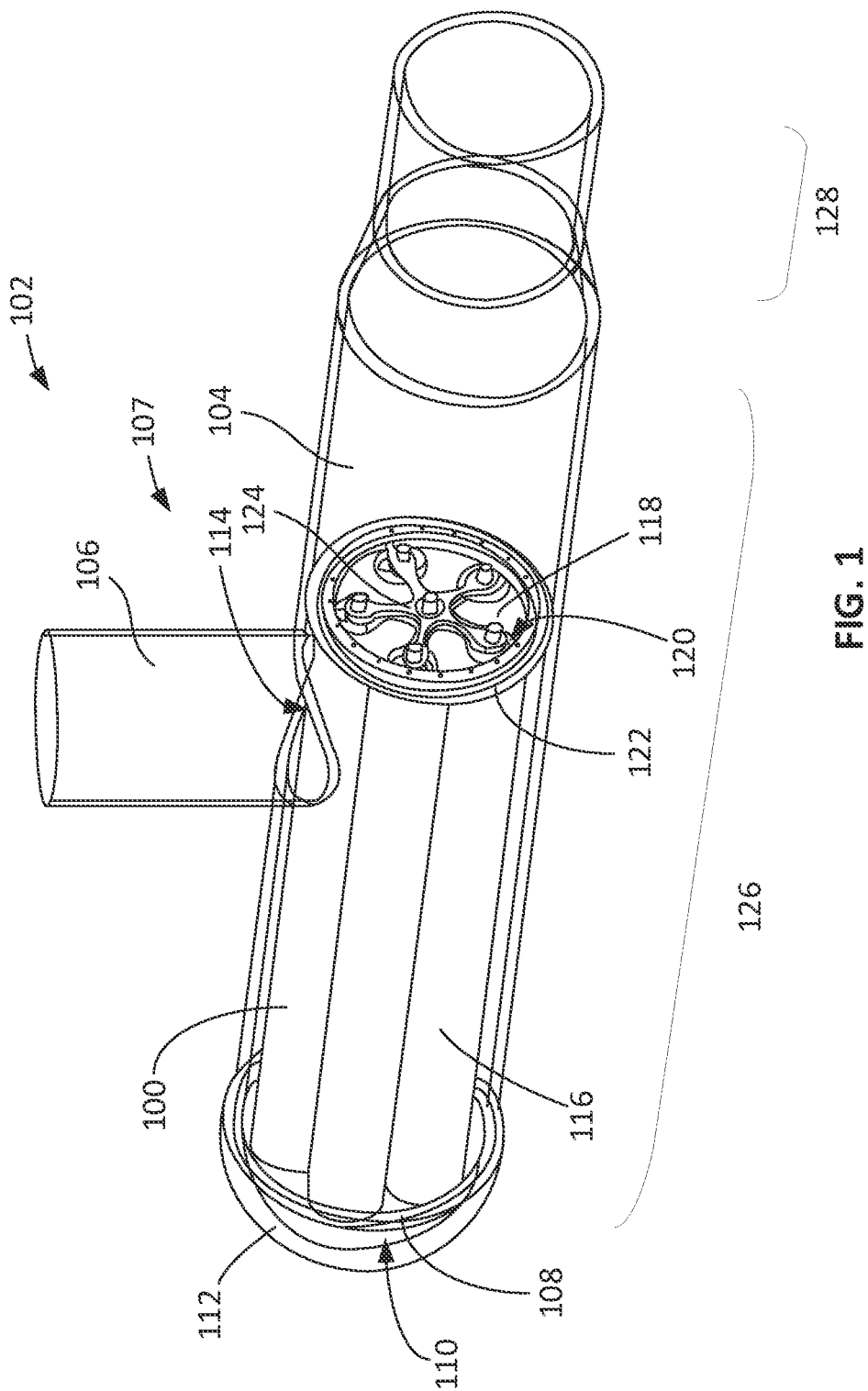
FIG. 1 is a perspective view of an example piping system including an example insert constructed in accordance with the teachings of this disclosure.

Turning to the figures, FIG. 1 illustrates an example insert 100 constructed in accordance with the teachings of this disclosure. The insert 100 is shown in connection with an example piping system 102. The piping system 102 can be a current or existing piping system, or can be a newly manufactured and/or installed piping system. The piping system 102 can include one or more interconnected pipes, sometimes referred to as a pipeline. Only a portion of the piping system 102 is shown in FIG. 1. The piping system 102 can be used to transport any type of fluid. For example, the piping system 102 can be a natural gas piping system that is used to transport natural gas. In other examples, the piping system 102 can be used to transport other fluids, such as water, crude oil, etc. All or a portion of the piping system 102 can be disposed below ground or above ground.

In the illustrated example, the piping system 102 includes a first pipe 104 and a second pipe 106 forming a joint 107. The first and second pipes 104, 106 are shown as transparent in FIG. 1 to expose the insert 100. Only portions of the first and second pipes 104, 106 are shown in FIG. 1. It is understood that the first and second pipes 104, 106 can extend any distance or length away from the joint 107 shown in FIG. 1. In some examples, the joint 107 is part of a trap or launcher/receiver barrel used to launch and/or receive pig equipment and tools.

In the illustrated example, the first pipe 104 has an end 108 with an opening 110. The opening 110 is covered or sealed with a cap 112 (e.g., a lid, a plate, a trap door, etc.) coupled to the end 108. In some examples, the cap 112 is connected to the end 108 of the first pipe 104 via threaded fasteners (e.g., bolts). In other examples, the cap 112 can be connected to the end 108 via other manners. The second pipe 106 is coupled to the first pipe 104 at an opening 114 formed in a side of the first pipe 104 near the end 108. In this example, the first and second pipes 104, 106 form a 90° turn or bend. In other examples, the first and second pipes 104, 106 can be connected at a different angle.

In some examples, the first pipe 104 is connected to an upstream supply source, and the second pipe 106 is connected to a downstream location. In such an example, fluid flows from the first pipe 104, through the opening 114, and then into the second pipe 106. In other examples, fluid can flow in the reverse direction (i.e., from the second pipe 106 to the first pipe 104). The piping system 102 can be constructed to accommodate any flow rate (e.g., 450 barrels per hour (bph), 700 bph, 1200 bph, etc.) and any pressure (e.g., 200 pounds-per-square-inch (psi), 475 psi, 1500 psi, etc.).

In some examples, the first and second pipes 104, 106 are separate pipes that are coupled together. For example, the first and second pipes 104, 106 can be coupled via welding and/or fasteners. In other examples, the first and second pipes 104, 106 can be constructed as a single unitary part or component. The first and second pipes 104, 106 can be constructed of any material suitable for containing the fluid within the piping system 102. For example, if the fluid is natural gas, the first and second pipes 104, 106 can be constructed of carbon steel. As another example, if the fluid is crude oil, the first and second pipes 104, 106 can be constructed of steel or plastic. The first and second pipes 104, 106 can be any diameter, such as 6 inches diameter nominal (DN), 12 inches DN, 2 feet DN, etc.

In this example, the insert 100 is a filter insert, referred to hereinafter as the filter insert 100. The filter insert 100 is used to filter contaminates and/or other unwanted particulate from the fluid as the fluid flows through the piping system 102. In other examples, the insert 100 can be implemented as another type of device. For example, other types of insert devices can include separator inserts, dehydrator inserts, combo inserts, debris shield inserts, and mist eliminator inserts.

Figure 2:
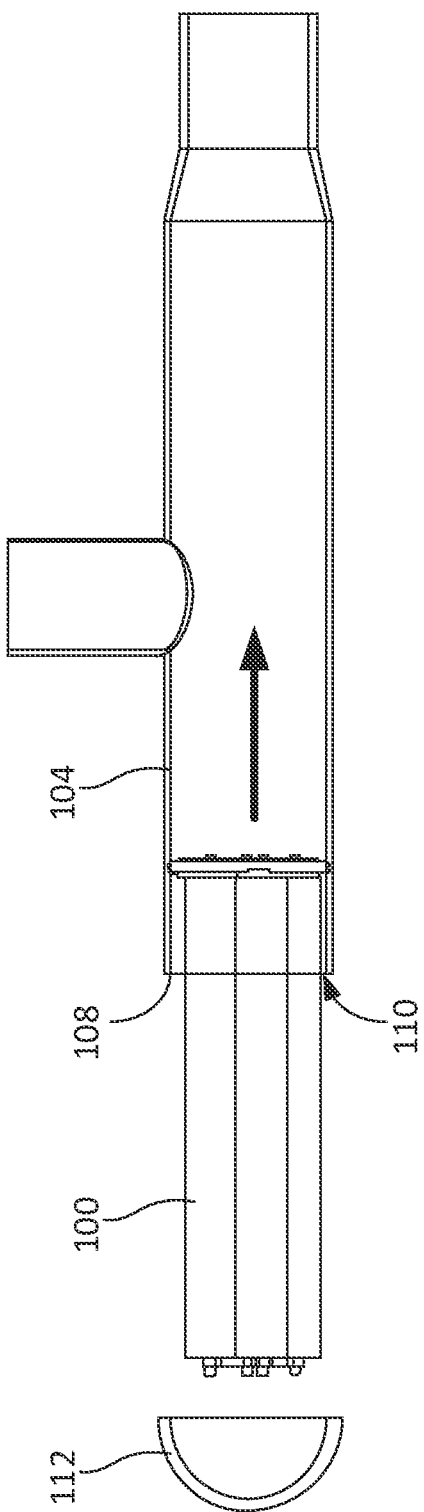
FIG. 2 is a side view of the example insert of FIG. 1 being inserted into an example pipe of the example piping system.
Figure 3:
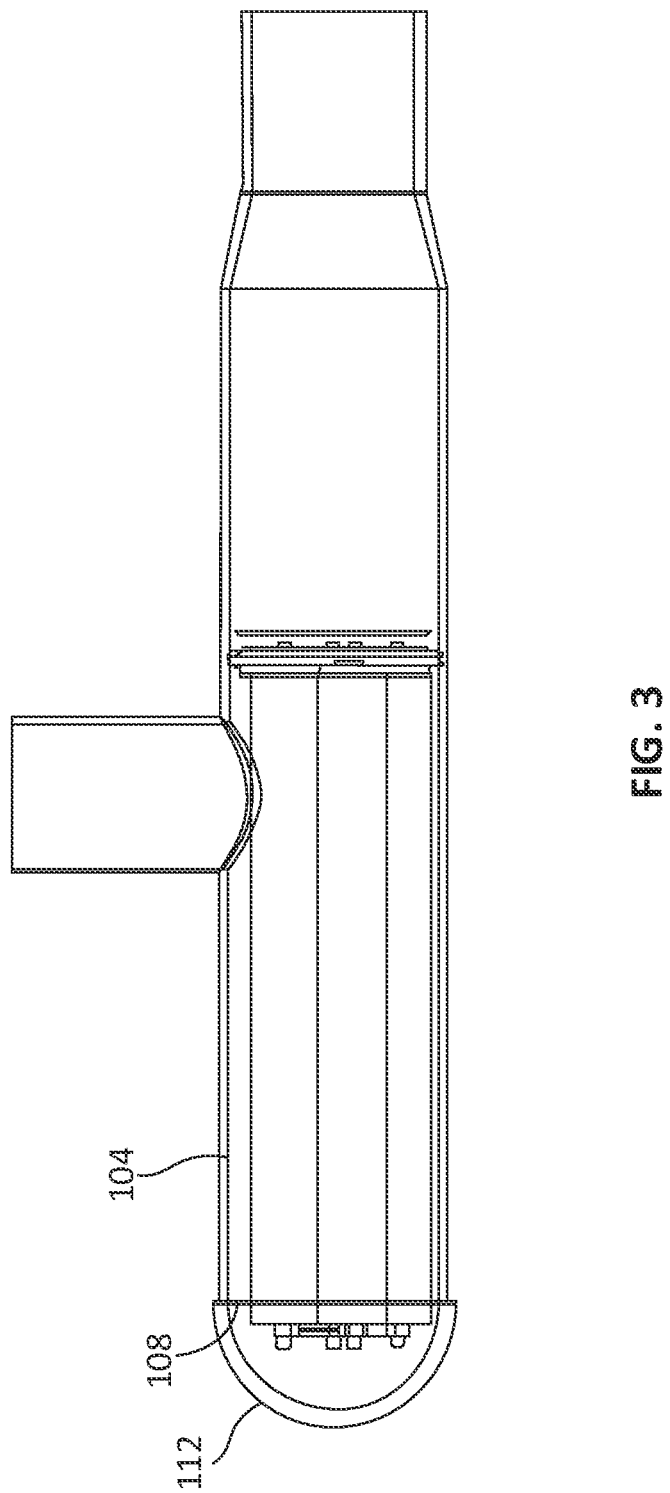
FIG. 3 is a side view of the example insert of FIG. 2 disposed in the example pipe of the example piping system.

In the illustrated example, the filter insert 100 is disposed in the first pipe 104 near the end 108 of the first pipe 104. In some examples, the area at or near the end 108 of the first pipe 104 is referred to as a trap. In some examples, the joint 107 having the trap is disposed above ground, while other portions of the piping system 102 are disposed below ground. The insert 100 can be inserted in the first pipe 104 via the opening 110 in the end 108 of the first pipe 104. For example, referring briefly to FIG. 2, the cap 112 can be removed from the end 108 of the first pipe 104. Then, the filter insert 100 can be inserted into the opening 110 in the end 108 of the first pipe 104, as shown by the direction of the arrow in FIG. 2. Then, the cap 112 can be reconnected to the end 108 of the first pipe 104, as shown in FIG. 3. To remove the filter insert 100, this example sequence can be performed in reverse. Having the filter insert 100 at or near the end 108 of the first pipe 104 enables easy access to the insert 100. However, in other examples, the insert 100 can be disposed in another location of a pipe, not near an end of the pipe.

Referring back to FIG. 1, when the filter insert 100 is installed in the first pipe 104, the filter insert 100 extends beyond the opening 114 in the first pipe 104. As such, fluid flows from the first pipe 104, through the filter insert 100, and through the opening 114 into the second pipe 106 (or vice versa). As disclosed above, the first and second pipes 104, 106 are constructed to withstand the pressures of the fluid within the piping system 102. As such, the filter insert 100 utilizes the existing structure (e.g., the first pipe 104) as a casing or housing for the filter insert. Therefore, the example filter insert 100 does not require a separate housing or structure to be coupled externally to the pipe or between two pipes as in known devices.

In some examples, the filter insert 100 includes one or more filter elements. In this example, the filter insert 100 includes a set of filter tubes 116 (one of which is referenced in FIG. 1). In some examples, the filter insert 100 includes five filter tubes 116. In other examples, the filter insert 100 can include more or fewer filter tubes (e.g., one, two, three, four, six, seven, etc.). The filter tubes 116 can be constructed of any type of material. In some examples, the filter tubes 116 are constructed of pleated filter material. In other examples, the filter tubes 116 can be constructed of other types of material, such as metal. The filter tubes 116 can be configured to filter out debris such as pipe scale, grit, sand, rust, etc., chemicals such as iron sulfide, and/or any other particulate that could cause damage or adverse effects to the downstream locations. Therefore, in this example, the filter tubes 116 provide means for filtering particulate from fluid in the piping system 102. The filter tubes 116 can be configured to filter out any size particulate. In some examples, the filter tubes 116 can filter out particles of at least 20 microns in size. In other examples, the filter tubes 116 can be designed to filter out particles that are smaller than 20 microns, such as 5 micron particles or smaller. The filter tubes 116 can be designed to filter any size particles depending on the specific application. For example, coarser filter tubes can be used to filter larger particles (e.g., 200 microns, 100 microns, etc.). Finer filter tubes can be used to filter out smaller particles (e.g., 1 micron, 0.1 micron, etc.). In some such examples, the filter tubes 116 create a coalescing effect to pull moisture or other matter. When the filter insert 100 becomes full, the filter insert 100 can be removed and cleaned or replaced with a new filter insert. In some examples, the filter insert 100 is cleaned or replaced when a threshold pressure drop (e.g., 20 psi) occurs across the filter insert 100.

Figure 10:
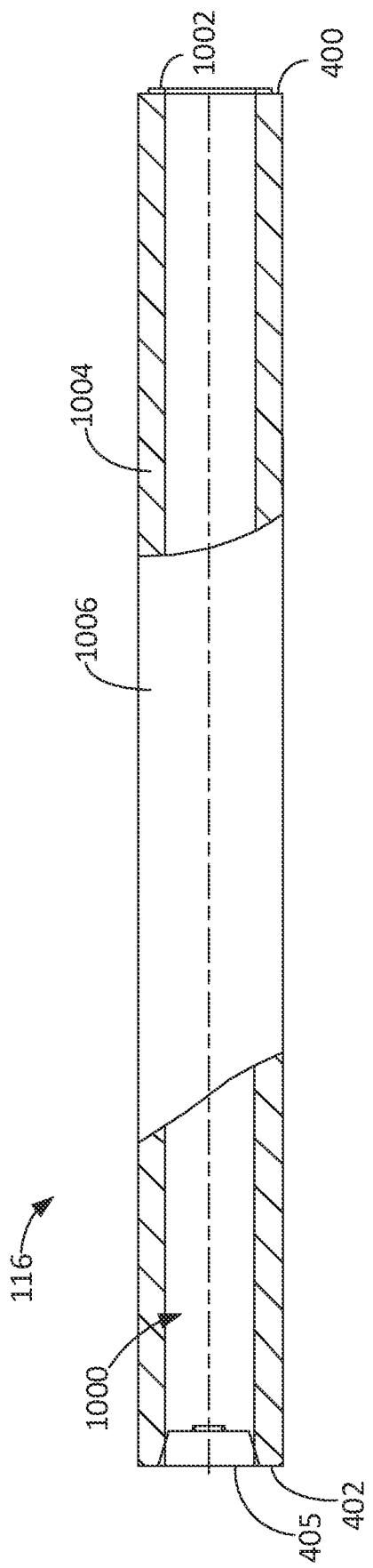
FIG. 10 is a partial cross-sectional view of an example filter tube of the example insert of FIG. 1.

In the illustrated example of FIG. 1, the filter insert 100 includes an end plate 118 (which may be referred to as a debris shield). The end plate 118 can be constructed of any material, such as metal (e.g., aluminum, stainless steel, carbon steel, etc.), plastic, etc., and/or any other material that is suitable to be exposed to the fluid in the piping system 102. The end plate 118 can be used to position the filter tubes 116 in the first pipe 104. Therefore, in this example, the end plate 118 provides means for positioning the filter tubes 116 in the first pipe 118. The filter tubes 116 are coupled to and extend from (e.g., are perpendicular to) a first side (labeled in FIG. 4) of the end plate 118. In the illustrated example of FIG. 1, the end plate 118 has a set of openings 120 (one of which is referenced in FIG. 1) that correspond with (e.g., are aligned with) openings in the ends of the filter tubes 116. In particular, the filter tubes 116 have respective channels (one of which is shown in FIG. 10) that are aligned with respective ones of the openings 120. The end plate 118 is sized to substantially fill the first pipe 104 when the insert is disposed in the first pipe 104. As such, the fluid is forced to flow through the openings 120 in the end plate 118 rather than around the end plate 118. Assuming the fluid flows from the first pipe 104, the fluid flows through the openings 120 in the end plate 118 and into the filter tubes 116. The fluid then flows through the walls of the filter tubes 116 (where filtering occurs) and into the surrounding area in the first pipe 104. The fluid then flows through the opening 114 and into the second pipe 106. In some examples, the pressure drop across the end plate 118 biases the filter insert 100 toward the cap 112, which holds the filter insert 100 in place in the first pipe 104. In some examples, the filter insert 100 is pushed against the cap 112. In other examples, the filter insert 100 may be spaced from the cap 112. For example, a spacer may be disposed between the end of the filter insert 100 and the cap 112. In other examples, fluid is supplied from the second pipe 106. In either flow direction, the filter insert 100 is disposed in the fluid flow path to provide filtering functionality.

In some examples, the diameter of the end plate 118 is the same as or slightly larger than the inner diameter of the first pipe 104, which creates a tight seal between the end plate 118 and the inner surface of the first pipe 104 to prevent leakage around the end plate 118. In some examples, the filter insert 100 includes a seal 122 (e.g., an o-ring) disposed around a circumference or outer peripheral edge of the end plate 118. The seal 122 creates a sealing engagement between the end plate 118 and an inner surface of the first pipe 104 to prevent leakage of fluid by the end plate 118. Therefore, in this example, the seal 122 provides means for sealing between the end plate 118 and the first pipe 104. In some examples, the seal 122 has a double rib or flange for two points of contact. In some examples, the diameter of the seal 122 is larger than an inner diameter of the first pipe 104, such that the seal 122 is compressed when the filter insert 100 is inserted into the first pipe 104 to create a tight seal. In other examples, the diameter of the seal 122 can be the same as or smaller than the inner diameter of the first pipe 104.

While, in this example, the first pipe 104 has a circular cross-section, in other examples, the first pipe 104 can have a different shaped cross-section (e.g., square, rectangular, etc.). The end plate 118 of the filter insert 100 can be sized and shaped to fit within the corresponding size and shape of the first pipe 104.

To couple the filter tubes 116 to the end plate 118, in the illustrated example of FIG. 1, the filter insert 100 includes a first retainer 124. The first retainer 124 has five arms that extend outward to the ends of the filter tubes 116. The filter insert 100 can also include a second retainer on the opposite end of the filter insert 100, which is disclosed in further detail herein. In some examples, the filter insert 100 includes support rods that extend through the filter tubes 116 and are coupled to the first and second retainers, which clamps the filter tubes 116 to the end plate 118, as disclosed in further detail herein.

Figure 4:
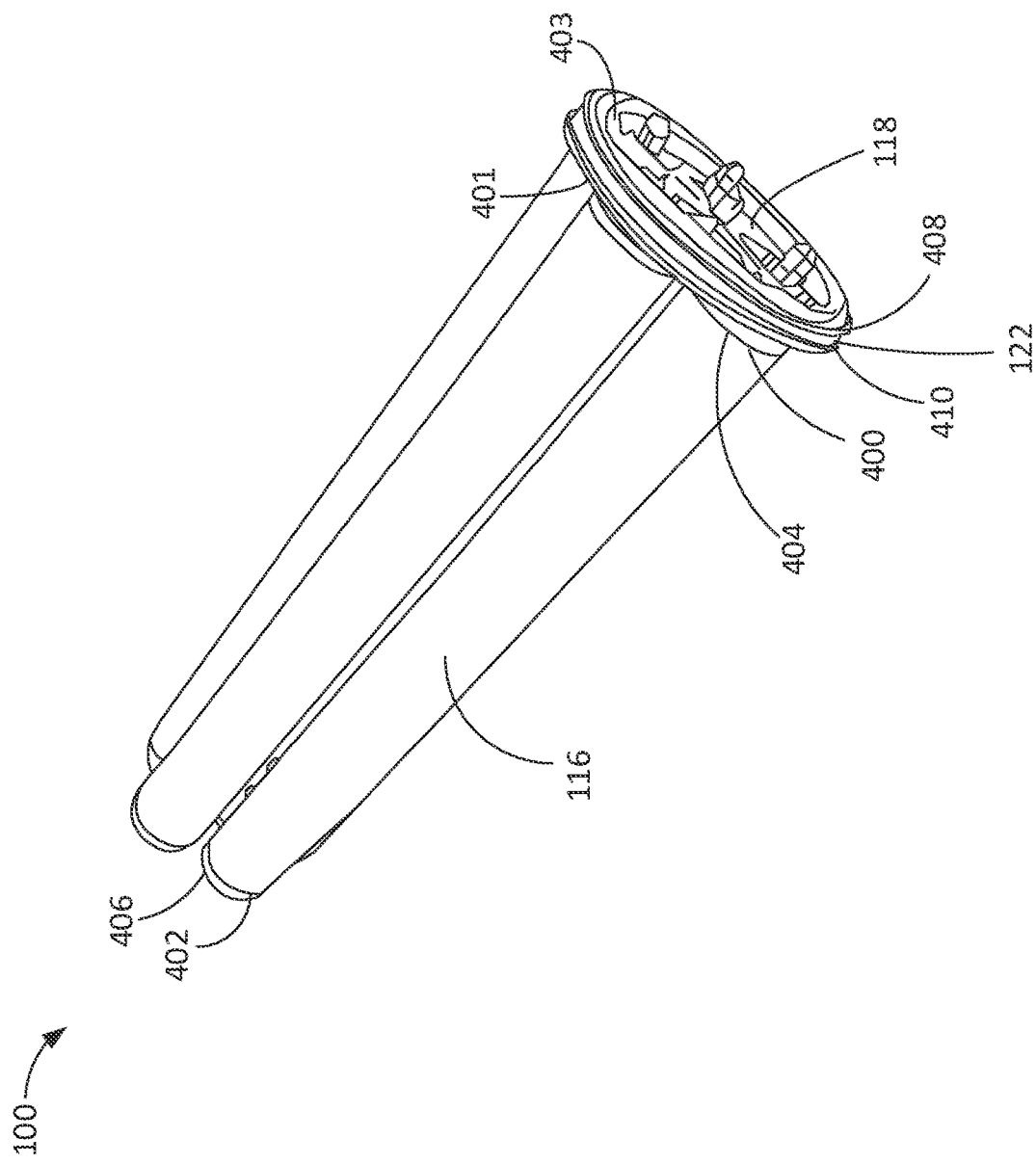
FIG. 4 is a perspective view of a first end of the example insert of FIG. 1.

FIG. 4 is a perspective view of a first end of the filter insert 100. In this example, the filter insert 100 includes five filter tubes 116 (one of which is referenced in FIG. 4). However, in other examples, the filter insert 100 can include any number of filter tubes. In this example, the filter tubes 116 are cylindrical. However, in other examples, the filter tubes 116 can be shaped differently.

As shown in FIG. 4, the end plate 118 has a first side 401 and a second side 403 opposite the first side 401. The filter tubes 116 extend from the first side 401. As shown in FIG. 4, each of the filter tubes 116 has a first end 400 and a second end 402 opposite the first end 400. The first ends 400 of the filter tubes 116 are coupled to (e.g., engaged with) the first side 401 of the end plate 118. In some examples, first caps 404 (one of which is referenced in FIG. 4) are disposed on the first ends 400 of the filter tubes 116. The first caps 404 have openings aligned with the channels in the filter tubes 116 and the openings 120 (FIG. 1) in the end plate 118. In some examples, the first caps 404 provide an interface between the first ends 400 of the filter tubes 116 and the first side 401 of the end plate 118. In other examples, the first caps 404 may not be provided. Instead, the first ends 400 of the filter tubes 116 can be directly engaged with the first side 401 of the end plate 118.

Figure 6:
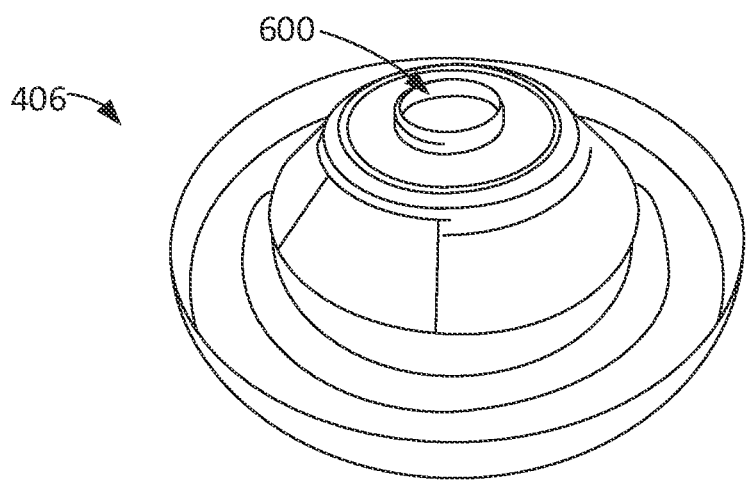
FIG. 6 is a perspective view of an example cap that can be used on an end of an example filter tube of the example insert of FIG. 1.

In some examples, second caps 406 (one of which is referenced in FIG. 4) are coupled to the second ends 402 of the filter tubes 116. Referring briefly to FIG. 6, FIG. 6 shows a backside of the one of the second caps 406. The second caps 406 prevent fluid flow out of the second ends 402 of the filter tubes 116. As such, fluid is forced to flow through the walls of the filter tubes 116. In the illustrated example of FIG. 6, the second cap 406 has an opening 600 to receive a support rod, which is disclosed in further detail herein.

As shown in FIG. 4, the seal 122 is disposed around a circumference of the end plate 118. In this example, the seal 122 has first and second flanges 408, 410 that are axially spaced apart. In some examples, the dual flange design improves sealing performance. In other examples, other types of seals can be used.

Figure 5:
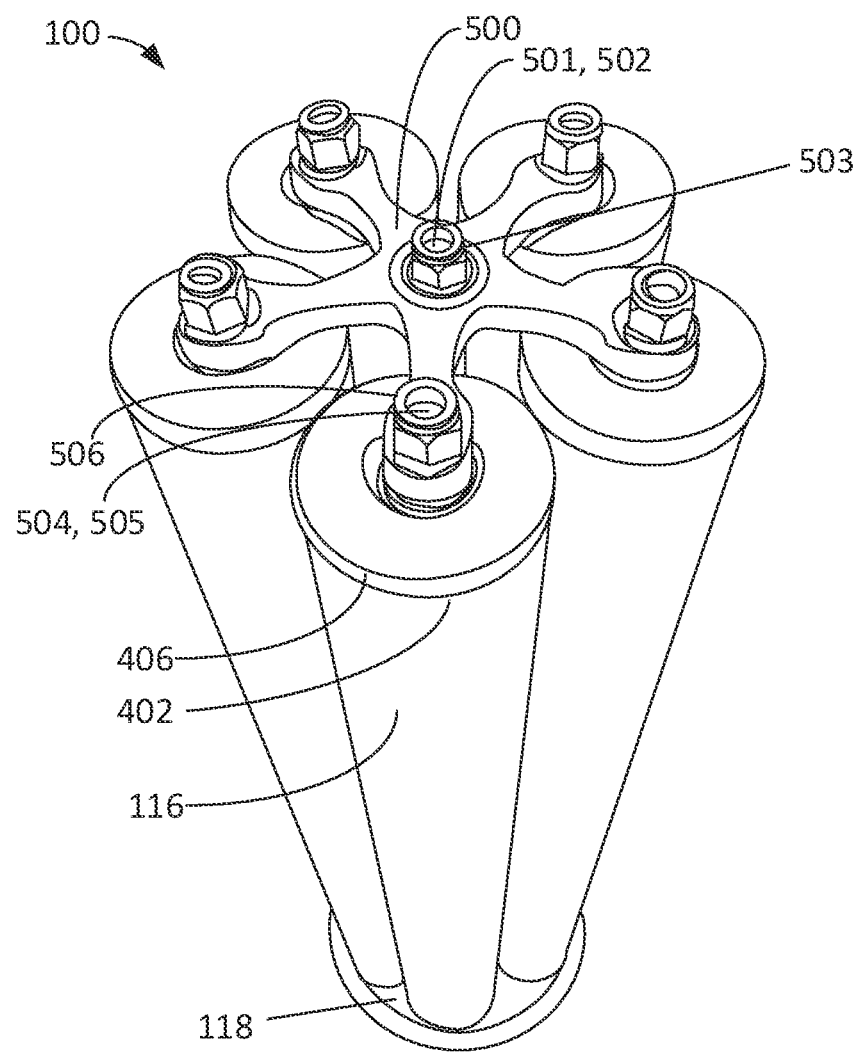
FIG. 5 is a perspective view of a second end of the example insert of FIG. 1.

FIG. 5 is a perspective view of a second end of the filter insert 100. As shown in FIG. 5, the filter insert 100 includes a second retainer 500. The second retainer 500 is coupled to the second ends 402 of the filter tubes 116 (one of which is referenced in FIG. 5). In this example, the second retainer 500 is a same shape and size as the first retainer 124. In some examples, this reduces manufacturing costs because the same part can be manufactured multiple times. The second retainer 500 has five arms extending to the centers of each of the filter tubes 116. In the illustrated example of FIG. 5, the second ends 402 of the filter tubes 116 are covered with the second caps 406 (one of which is referenced in FIG. 5). s In the illustrated example of FIG. 5, the filter insert 100 includes a central rod 502. A first end (labeled in FIG. 8) of the central rod 502 extends through the end plate 118 and the first retainer 124 (FIG. 1), and a second end 501 of the central rod 502 extends through the second retainer 500, as shown in FIG. 5. The ends of the central rod 502 are threaded. A first threaded fastener (e.g., a nut) (labeled in FIG. 8) is coupled to the first end of the central rod 502, and a second threaded fastener 503 (e.g., a nut) is coupled to the second end 501 of the central rod 502, thereby clamping the filter tubes 116 between the first retainer 124 (and the end plate 118) and the second retainer 500. In some examples, if it is desired to separate the filter insert 100 from the cap 112 (FIG. 1), the central rod 502 can be extended further outward from the second retainer 500, such that the central rod 502 engages the cap 112 and separates the rest of the filter insert 100 from the cap 112.

In the illustrated example of FIG. 5, the filter insert 100 includes a set of support rods 504 (one of which is referenced in FIG. 5). The support rods 504 extend through respective ones of the channels of the filter tubes 116. In particular, the support rods 504 extend beyond the second ends 402 of the filter tubes 116. The support rods 504 also extend beyond the first ends 400 of the filter tubes 116 and through the openings 120 (FIG. 1) in the end plate 118, as shown in further detail in FIG. 8. The support rods 504 have first ends (labeled in FIG. 8) and second ends 505 opposite the first ends. In this example, the filter insert 100 includes five support rods 504. However, in other examples, the filter insert 100 can include more or fewer support rods 504. In some examples, the central rod 502 and the support rods 504 are constructed of metal (e.g., stainless steel, aluminum, etc.). In other examples, the central rod 502 and the support rods 504 can be constructed of other materials.

The second retainer 500 is coupled to the support rods 504 at or near the second ends 505 of the support rods 504. As such, the filter tubes 116 are clamped between the end plate 118 and the second retainer 500. For example, as shown in FIG. 5, the support rods 504 extend through the second retainer 500. In some examples, the second ends 505 of the support rods 504 are threaded. The filter insert 100 includes second threaded fasteners 506 (e.g., nuts) (one of which is referenced in FIG. 5) coupled to the second ends 505 of the support rods 504. As such, the second retainer 500 is disposed between the second threaded fasteners 506 and the filter tubes 116. The second threaded fasteners 506 can be tightened, thereby clamping the filter tubes 116 between the end plate 118 and the second retainer 500. In other examples, the filter tubes 116 can be coupled to the end plate 118 (FIG. 1) using an alternative mechanism.

Figure 7:
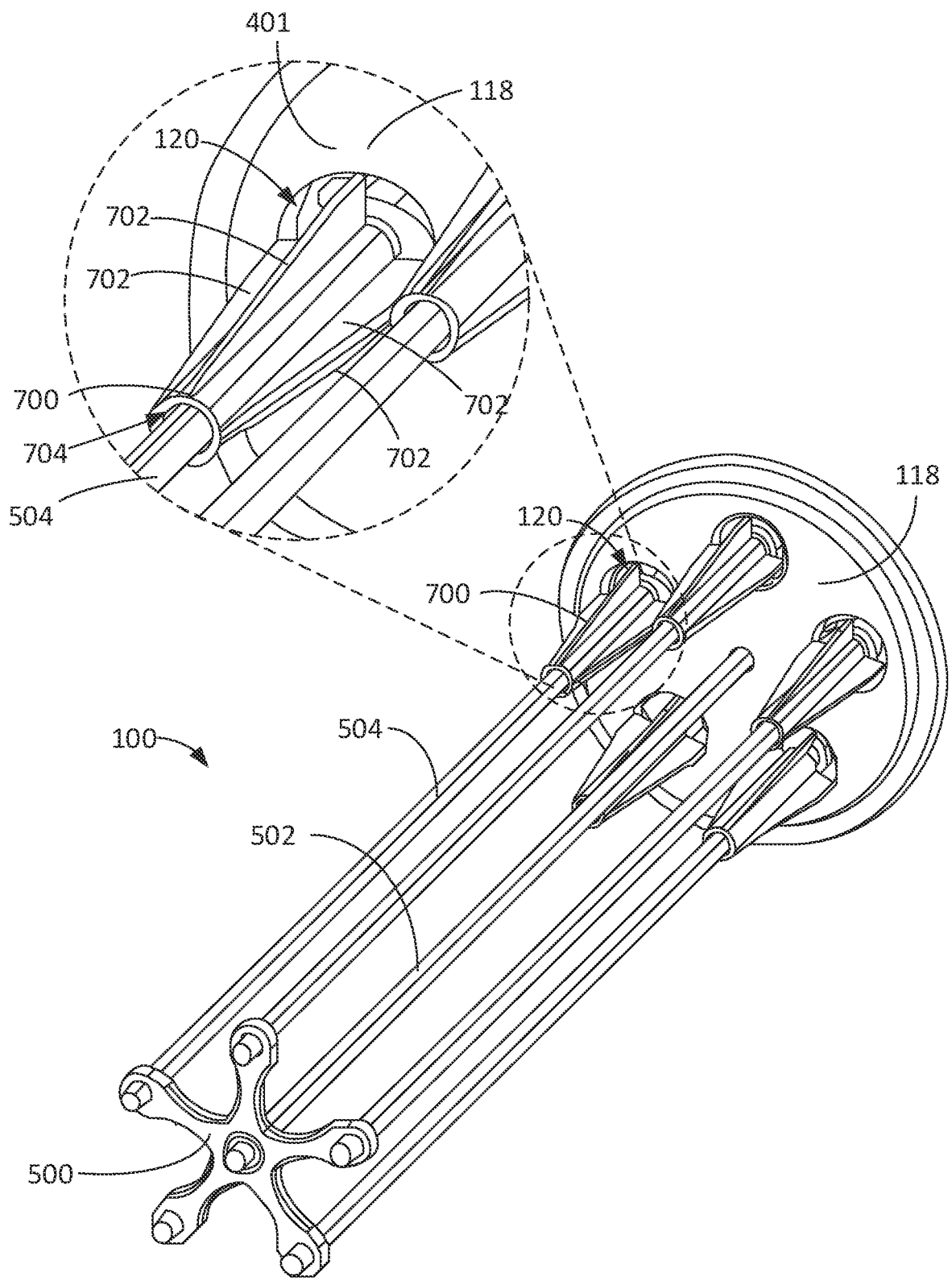
FIG. 7 is a perspective view of the example insert of FIG. 1 without example filter tubes.

FIG. 7 is a perspective view of the filter insert 100 without the filter tubes 116. FIG. 7 shows the end plate 118, the second retainer 500, the central rod 502, and the support rods 504 (one of which is referenced in FIG. 7). The filter insert 100 has a central axis 701. The support rods 504 are parallel to and spaced from the central axis 701, and the central rod 502 is aligned with the central axis 701. As shown in FIG. 7, the central rod 502 and each of the support rods 504 extends through the end plate 118 (and the first retainer 124 (FIG. 1)). In particular, the support rods 504 extend through the openings 120 (one of which is referenced in FIG. 7) in the end plate 118. In some examples, the diameter of the openings 120 is the same or substantially the same as the inner diameter of the filter tubes 116.

In the illustrated example of FIG. 7, the filter insert 100 includes fin members 700 (one of which is referenced in FIG. 7) on the support rods 504. Each of the fin members 700 has a set of fins that extends radially outward from the respective support rods 504. The fin(s) help centralize and support the filter tubes 116 (FIG. 1) on the support rods 504. The fin(s) also align the channels of the filter tubes 116 with the openings 120 in the end plate 118.

A callout of one of the fin members 700 is shown in FIG. 7. The other fin members 700 are identical to the fin member 700 shown in the callout. Thus, any of the example aspects disclosed in connection with the fin member 700 in the callout can likewise apply to the other fin members 700 of the example filter insert 100.

In this example, the fin member 700 has a set of fins 702. The fins 702 extend radially outward from the support rod 504. The fin member 700 is coupled to the support rod 504 and, thus, the fins 702 are coupled to the support rod 504. When the filter tube 116 is disposed over the fin member 700, the fins 702 engage an inner surface of the channel of the filter tube 116. The fins 702 support the first end 400 (FIG. 4) of the filter tube 116 and align the channel of the filter tube 116 with the opening 120 in the end plate 118. In some examples, the diameter of the area created by the fins 702 is the same as or larger than the diameter of the opening 120. In the illustrated example of FIG. 7, the fin member 700 is disposed at or near the end plate 118. In some examples, the fins 702 are engaged with the first side 401 end plate 118. In other examples, the diameter of the area created by the fins 702 is less than the diameter of the opening 120. As shown in the callout of FIG. 7, the fins 702 are tapered in a direction away from the end plate 118. In some examples, this taper helps to insert the fin member 700 into the first end 400 (FIG. 4) of the filter tube 116 during assembly. In other examples, the fins 702 may not be tapered.

In this example, the fin member 700 includes four fins 702. In this example, the fins 702 are spaced about 90° (e.g., ±5°) apart from each other. In other examples, the fins 702 may be spaced differently. Further, in other examples, the fin member 700 may include more or fewer fins (e.g., one fin, two fins, three fins, five fins, etc.).

In some examples, the support rod 504 extends through a channel 704 in the fin member 700. As such, the fin member 700 may be axially slidable along the support rod 504. In some examples, the fin member 700 is held stationary relative to the support for 504 via friction fit, an adhesive (e.g., glue), and/or a fastener. While, in this example, the fins 702 are part of the fin member 700, in other examples, the fins 702 can be coupled directly to the support for 504 and/or otherwise formed directly with the support rod 504.

Figure 8:
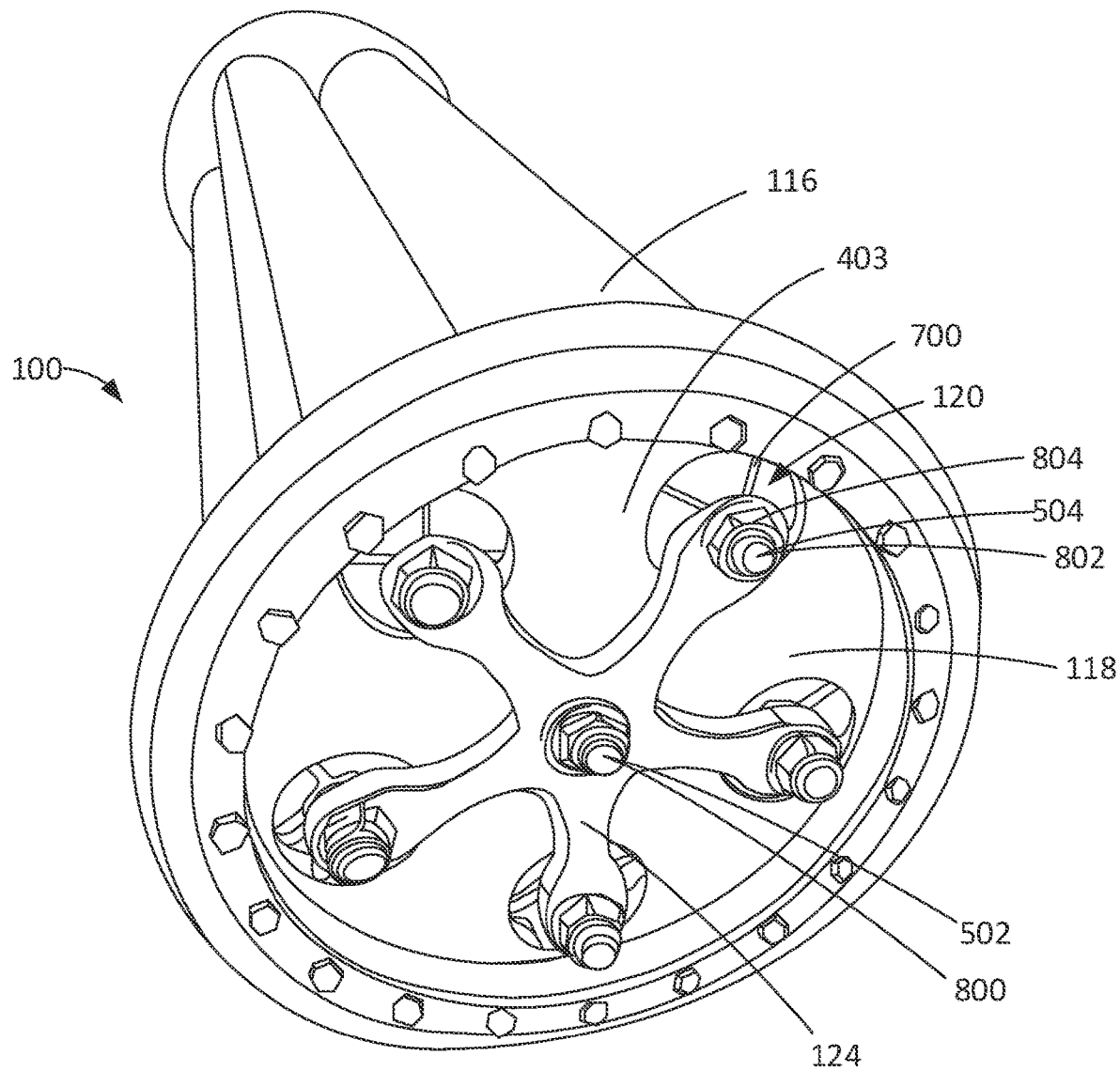
FIG. 8 is another perspective view of the first end of the example insert of FIG. 1.

FIG. 8 is a perspective view of the first end of the filter insert 100 showing the openings 120 (one of which is referenced in FIG. 8) in the end plate 118. During operation, fluid from a piping system flows through the openings 120, between the fins 702 (FIG. 7) of the fin members 700 (one of which is referenced in FIG. 7) and into the channel of the filter tubes 116 (one of which is reference in FIG. 7). The fluid flows through the walls of the filter tubes 116 and into the surrounding area.

As shown in FIG. 8, a first end 800 of the central rod 502 and first ends 802 of the support rods 504 extend beyond the end plate 118 and the first retainer 124. In the illustrated example, the first retainer 124 is coupled to central rod 502 and the support rods 504 at or near first ends 800, 802. For example, as shown in FIG. 8, the central rod 502 and the support rods 504 (one of which is referenced in FIG. 8) extend through the end plate 118 and through the first retainer 124. In some examples, the first ends 800, 802 of the central rod 502 and the support rods 504 are threaded. The filter insert 100 includes first threaded fasteners 804 (e.g., nuts) (one of which is referenced in FIG. 8) coupled to the first ends 800, 802 of the central rod 502 and the support rods 504. As such, the first retainer 124 is clamped between the first threaded fasteners 804 and the second side 403 of the end plate 118. This also clamps the filter tubes 116 between the first retainer 124 (and the end plate 118) and the second retainer 500 (FIG. 5). Therefore, in this example, the first retainer 124, the second retainer 500, and the central rod 502 and the support rods 504 provide means for coupling the filter tubes 116 to the end plate 118. In some examples, the first and second retainers 124, 500 are constructed of metal (e.g., stainless steel, aluminum, etc.). In other examples, the first and second retainers 124, 500 are constructed of other materials.

Figure 9:
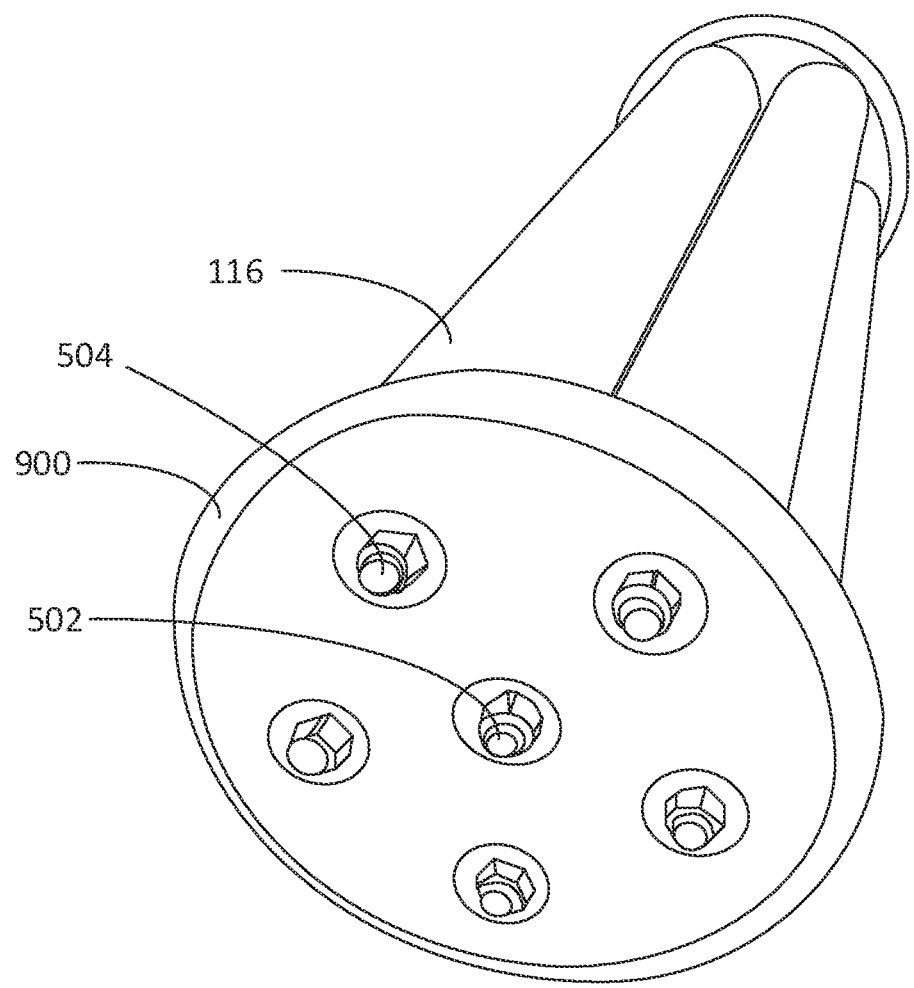
FIG. 9 is another perspective view of the second end of the example insert of FIG. 1 having an alternative end plate.

In some examples, instead of using the second retainer 500, a second end plate can be coupled to the second ends 402 of the filter tubes 116. For example, FIG. 9 shows an example in which a second end plate 900 is coupled to the second ends 402 (FIG. 4) of the filter tubes 116 (one of which is reference in FIG. 9). The central rod 502 and the support rods 504 (one of which is reference in FIG. 9) extend through the second end plate 900. Threaded fasteners (e.g., nuts) can be coupled to the central rod 502 and the support rod 504 to couple the second end plate 900 to the second ends 402 of the filter tubes 116.

FIG. 10 is a partial cross-sectional view of one of the example filter tubes 116. The other filter tubes 116 are identical to the filter tube 116 shown in FIG. 10. Thus, any of the example aspects disclosed in connection with the filter tube 116 in FIG. 10 can likewise apply to the other filter tubes 116 of the example filter insert 100.

The filter tube 116 has the first end 400 and the second end 402 and a channel or passageway 1000 extending between openings in the first and second ends 400, 402. The second cap 406 is coupled to the second end 402 and blocks the opening in the second end 402. In some examples, a cap (e.g., the first cap 404 (FIG. 4)) is also provided on the first end 400. Such a cap includes an opening aligned with the opening to the passageway 1000. In the illustrated example, the filter tube 116 includes a gasket 1002 coupled (e.g., via an adhesive) to the first end 400. In some examples, the gasket 1002 is disposed between the first end 400 of the filter tube 116 and the first side 401 (FIG. 1) of the end plate 118 (FIG. 4). The gasket 1002 helps provide a tight seal between the first end 400 of the filter tube 116 and the end plate 118. In some examples, the filter tube 116 includes a cylindrical body 1004. The cylindrical body 1004 can be constructed of pleated material. In some examples, an outer liner 1006 is wrapped around the cylindrical body 1004.

As disclosed above, in other examples, the insert 100 can be designed as another type of insert to perform another function. In such an example, the filter tubes 116 can be replaced with another device or cartridge and coupled to the end plate 118. For example, the insert 100 may be a separator insert, a dehydrator insert, a combo insert, a debris shield insert, and/or a mist eliminator insert. A dehydrator insert, for example, can include a hydrator cartridge coupled to the end plate 118. The dehydrator cartridge can include a chemical, such as silica, to perform a drying function as the fluid passes through the insert.

Referring back to FIG. 1, the section of the first pipe 104 with the filter insert 100 has a larger diameter than the rest of the first pipe 104. For example, as shown in FIG. 1, the first pipe 104 has a first section 126 (which may be referred to as an overbore) with a first diameter a second section 128 with a second diameter that is smaller than the first diameter. The filter insert 100 is disposed within the first section 126 having the first diameter. In some examples, the first section 126 has a 12 inch DN and the second section 128 has a 10 inch DN. In other examples, the diameters of the first and second sections 126, 128 can be larger or smaller. The transition between the first and second sections 126, 128 can be tapered or formed as a step. In some examples, the first section 126 is enlarged to enable launching and/or receiving a pig device, an example of which is disclosed below in connection with FIG. 11. In other examples, the first pipe 104 may have a constant diameter, or the section with the filter insert 100 can be smaller than the rest of the first pipe 104.

Figure 11:
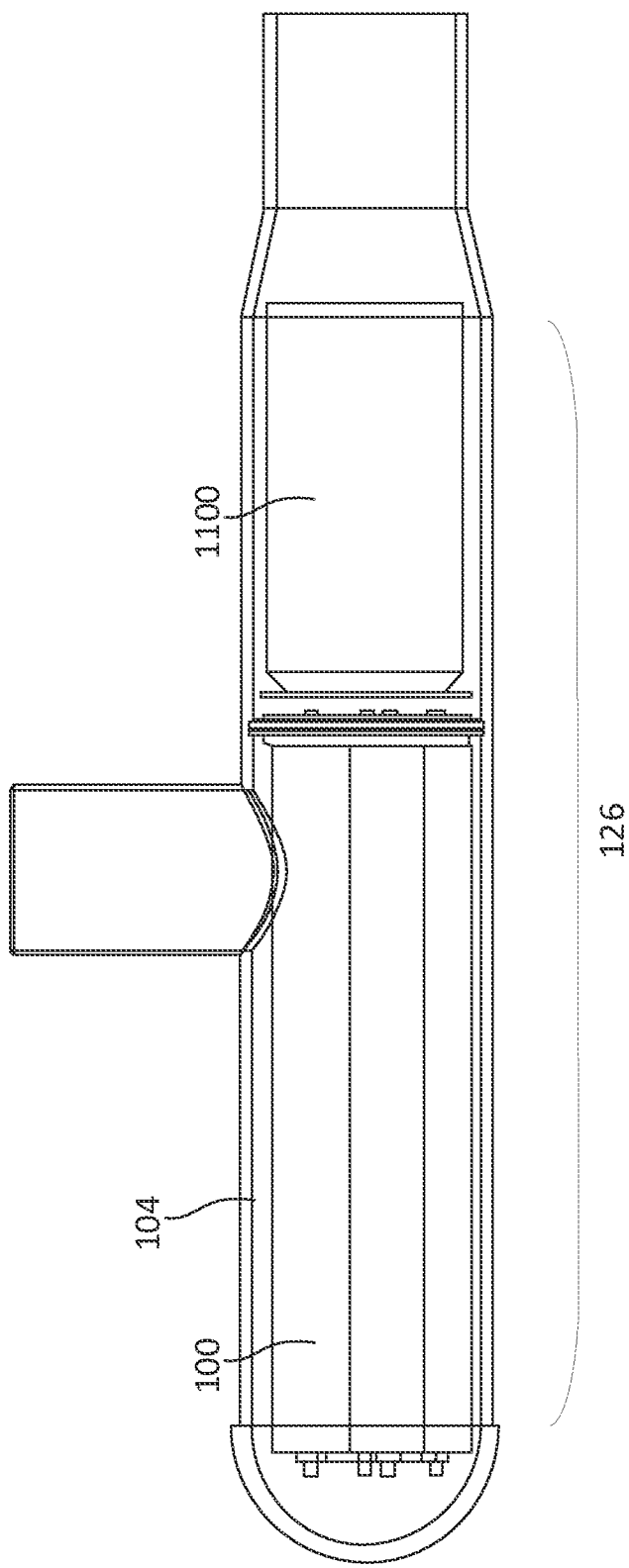
FIG. 11 is a side view of the example piping system with the example insert of FIG. 1 and an example pig.

FIG. 11 shows the filter insert 100 and an example scraper or pig 1100, sometimes referred to as a pipeline inspection gauge tool or device. A pig is a device that moves through a pipeline to perform one or more functions, such as measuring the inner walls of the pipeline, cleaning the pipeline, etc. The filter insert 100 can be removed from the first pipe 104 to insert or remove the pig 1100. In such an example, the first section 126 of the first pipe 104 may be considered a pig launching/receiving station, where the pig 1100 is launched and/or received. In some examples, the first section 126 is longer than the filter insert 100 to accommodate launching and/or catching the pig 1100 in the first section 126. In other words, the filter insert 100 can be shorter than the first section 126 such that the pig 1100 can be disposed entirely within the first section 126 of the first pipe 104 along with the filter insert 100. This helps to reduce or prevent depressurization problems when removing the pig 1100. In some examples, the filter insert 100 and the pig 1100 are able to be connected, such that the filter insert 100 and the pig 1100 can be inserted into the first pipe 104 and/or removed from the first pipe 104 as a unit.

Figure 12:
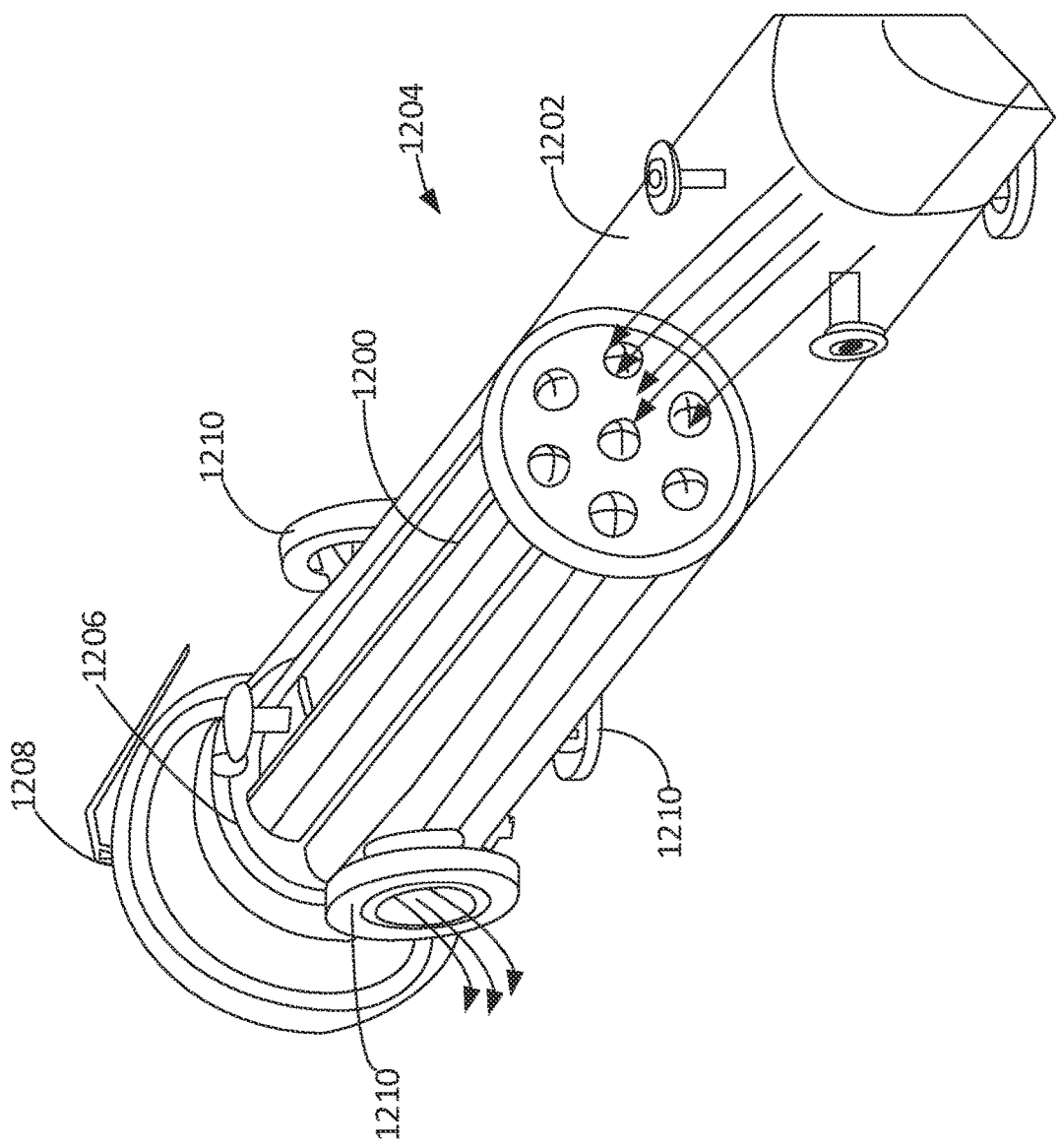
FIG. 12 is a perspective view of an example piping system including an example insert constructed in accordance with the teachings of this disclosure.

FIG. 12 shows another example filter insert 1200 disposed in a pipe 1202 of a piping system 1204. An end 1206 of the pipe 1202 is covered or sealed with a cap 1208. The filter insert 1200 is disposed in the pipe 1202 near the end 1206. The filter insert 1200 can be inserted into the pipe 1202 via the end 1206. The filter insert 1200 is similar to the filter insert 100 disclosed above and includes an end plate and a plurality of filter tubes coupled to and extending from the end plate. In this example, the pipe 1202 has multiple ports 1210. One or more pipes can be coupled (e.g., via threaded fasteners in the flanges) to one or more of the respective ports 1210. Fluid flows from an upstream supply source, through the filter insert 1200, and through the ports 1210 to the downstream pipes. In other examples, the flow may be reversed.

Figure 13:
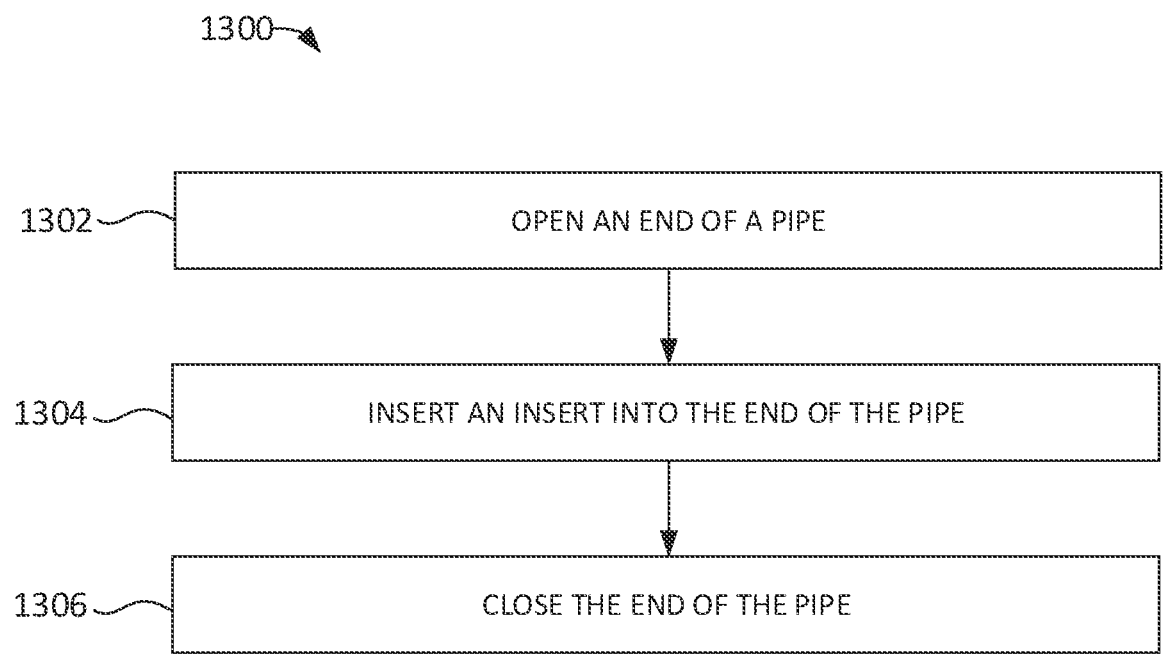
FIG. 13 is a flowchart representative of an example method of installing an example insert in an example pipe of an example piping system.

FIG. 13 is a flowchart representative of an example method 1300 of installing an example insert. The example method 1300 is described in connection with the filter insert 100 and the piping system 102 of FIG. 1. However, the example method 1300 can be similarly performed in connection with other types of inserts, such as separator inserts, dehydrator inserts, combo inserts, debris shield inserts, and mist eliminator inserts. The piping system 102 may be an existing piping system or may be a newly constructed and/or installed piping system. In some examples, the piping system 102 is a natural gas piping system. The example method 1300 can be partially or fully automated (e.g., performed via one or more machines or systems) and/or can be partially or fully performed manually (e.g., via one or more person).

At block 1302, the example method 1300 includes opening the end 108 of the first pipe 104. For example, the end 108 may be opened by removing the cap 112 or swinging or sliding the cap 112 to an open position. The end 108 of the first pipe 104 can be part of a pig launching or receiving barrel.

At block 1304, the example method 1300 includes inserting the filter insert 100 into the end 108 of the first pipe 104. In some examples, the filter insert 100 is manually inserted via one or more persons. In other examples, a hoist or other listing device can be used to lift and insert the filter insert 100. In some examples, the method 1300 includes, prior to inserting the filter insert 100 into the end 108 of the first pipe 104, inserting a PIG (a pipeline inspection gauge or pipeline intervention device) into the end 108 of the first pipe 104. The PIG can travel through the piping system 102 and perform one or more functions (e.g., cleaning, inspection, etc.).

At block 1306, the method 1300 includes closing the end 108 of the first pipe 104. For example, the cap 112 may be reconnected or coupled to the end 108 of the first pipe 104, such as by inserting and/or tightening the threaded fasteners. To remove the filter insert 100, the example method can be performed in reverse. In some examples, the filter insert 100 can be removed and another in-pipe insert can be inserted (e.g., another filter insert, a dehydrator, a mist eliminator).

In some examples, prior to installing the filter insert 100, one or more upstream or downstream valves can be closed to prevent fluid flow through the joint 107. In some examples, the joint 107 is bypassed such that flow through the rest of the piping system 102 does not stop.

An example method of using the filter insert 100 includes cleaning or filtering, with the filter insert 100, fluid in the piping system 102 as the fluid flows through the filter insert 100. In some examples, the method includes launching a pig, such as the pig 1100, in the piping system 102 to clean and/or inspect the walls of the pipes of the piping system 102. The pig 1100 may remove or knock loose any particulate and debris along the walls of the pipes. This particulate and debris can be captured by the filter insert 100.

Example apparatus, systems, methods, and articles of manufacture relating to in-pipe insert and piping systems have been disclosed. Examples and example combinations include the following:

Example 1 is a filter insert to be disposed in a pipe of a piping system. The filter insert includes an end plate having a set of openings and a set of filter tubes extending from a first side of the end plate. The filter tubes have respective channels aligned with respective ones of the openings. The filter insert includes a set of support rods extending through respective ones of the channels of the filter tubes. The support rods extend through the openings in the end plate. The filter insert also includes a first retainer disposed on a second side of the end plate. The first retainer is coupled to the support rods at or near first ends of the support rods. The filter insert also includes a second retainer coupled to the support rods at or near second ends of the support rods opposite the first ends such that the filter tubes are clamped between the end plate and the second retainer.

Example 2 includes the filter insert of Example 1, further including first threaded fasteners coupled to the first ends of the support rods such that the first retainer is disposed between the first threaded fasteners and the second side of the end plate.

Example 3 includes the filter insert of Example 2, further including second threaded fasteners coupled to the second ends of the support rods such that the second retainer is disposed between the second threaded fasteners and the filter tubes.

Example 4 includes the filter insert of any of Examples 1-3, further including caps on the ends of the filter tubes.

Example 5 includes the filter insert of any of Examples 1-4, wherein the support rods are parallel to and spaced from a central axis of the filter insert.

Example 6 includes the filter insert of Example 5, further including a central rod aligned with the central axis. The central rod extends through the first retainer, the end plate, and the second retainer.

Example 7 includes the filter insert of Example 6, further including a first threaded fastener coupled to a first end of the central rod and a second threaded fastener coupled to a second end of the central rod.

Example 8 includes the filter insert of any of Examples 1-7, wherein the second retainer is a same shape and size as the first retainer.

Example 9 includes the filter insert of any of Examples 1-8, further including a seal disposed around a circumference of the end plate. The seal has first and second flanges axially spaced apart.

Example 10 includes the filter insert of any of Examples 1-9, further including fins extending radially outward from each of the support rods near the end plate. The fins are to support the respective filter tubes.

Example 11 includes the filter insert of any of Examples 1-10, wherein each of the filter tubes includes a cylindrical body constructed of a pleated material and an outer liner wrapped around the cylindrical body.

Example 12 is a piping system including a first pipe having an end, a second pipe coupled to the first pipe at an opening formed in a side of the first pipe near the end, and a filter insert disposed in the first pipe near the end of the first pipe. The filter insert includes an end plate having an opening and a filter tube extending from a side of the end plate. The filter tube has a channel aligned with the opening such that when fluid flows through the first pipe, the fluid flows through the opening and into the channel of the filter tube. The filter include also includes a support rod extending through the channel of the filter tube and a set of fins extending radially outward from the support rod and engaged with the filter tube.

Example 13 includes the piping system of Example 12, wherein the set of fins includes four fins.

Example 14 includes the piping system of Example 13, wherein the fins are spaced about 90° apart from each other.

Example 15 includes the piping system of any of Examples 12-14, wherein the fins are engaged with the side of the end plate.

Example 16 includes the piping system of any of Examples 12-15, wherein the side of the end plate is a first side, and wherein the support rod extends through the opening in the end plate. The filter insert further includes a retainer disposed on a second side of the end plate. The retainer is coupled to the support rod at or near a first end of the support rod.

Example 17 includes the piping system of Example 16, wherein the retainer is a first retainer. The filter insert further includes a second retainer coupled to the support rod at or near a second end of the support rod.

Example 18 is a filter insert to be disposed in a pipe of a piping system. The filter insert includes means for filtering particulate from fluid in the piping system. The filtering means has a channel. The filter insert includes means for positioning the filtering means in the pipe. The positioning means has an opening. The filter insert also includes a support rod extending through the channel of the filtering means and a set of fins extending radially outward from the support rod and engaged with the filtering means. The fins are to align the channel of the filtering means with the opening in the positioning means.

Example 19 includes the filter insert of Example 18, further including means for sealing between the positioning means and the pipe.

Example 20 includes the filter insert of Examples 18 or 19, further including means for coupling the filtering means to the positioning means.

Example 21 is a method including opening an end of a first pipe. A second pipe is coupled to the first pipe at an opening formed in a side of the first pipe near the end. The first and second pipes are part of a piping system. The method includes inserting a filter insert of any of Examples 1-20 into the end of the first pipe and closing the end of the first pipe.

Example 22 includes the method of Example 21, wherein the piping system is a natural gas piping system.

Example 23 includes the method of Examples 21 or 22, further including, prior to inserting the filter insert into the end of the first pipe, inserting a pipeline inspection gauge or pipeline intervention device into the end of the first pipe.

Example 24 includes the method of any of Examples 21-23, wherein the filter insert includes a seal disposed around a circumference of the end plate, the seal to create a sealing engagement between the end plate and an inner surface of the first pipe.

Example 25 is a piping system including a first pipe having an end, a second pipe coupled to the first pipe at an opening formed in a side of the first pipe near the end, and an insert disposed in the first pipe near the end.

Example 26 is a filter insert to be disposed in a pipe of a piping system. The filter insert includes a filter and an end plate. The filter coupled to the end plate. The end plate sized to substantially fill the pipe of the piping system when the filter insert is disposed in the pipe.

Example 27 is a method including opening an end of a first pipe. A second pipe is coupled to the first pipe at an opening formed in a side of the first pipe near the end. The method includes inserting an insert into the end of the first pipe and closing the end of the first pipe.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it can be appreciated that example in-pipe inserts have been disclosed that utilize or leverage existing pipes as a housing or casing for the in-pipe inserts. This significantly reduces manufacturing costs and time associated with the disclosed filters and other types of inserts. Further, the disclosed in-pipe inserts can be configured to perform various functions, such as filtering, dehydrating, shielding debris, and/or mist elimination.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A filter insert to be disposed in a pipe, the filter insert comprising:
   a debris shield having an opening;
   a filter tube having a first end, a second end, and a first channel between the first and second ends, the first end coupled to the debris shield;
   a support rod in the first channel of the filter tube;
   a cylindrical body member having a second channel, the support rod extending through the second channel of the cylindrical body member; and
   fins coupled to and extending radially outward from the cylindrical body member and engaged with an inner surface of the filter tube that defines the first channel, the fins to align the first channel of the filter tube with the opening in the debris shield.

2. The filter insert of claim 1, wherein the fins are engaged with the debris shield.

3. The filter insert of claim 2, wherein the fins are tapered inward in a direction away from the debris shield.

4. The filter insert of claim 1, wherein a diameter of an area created by the fins is the same as or larger than a diameter of the opening.

5. The filter insert of claim 1, wherein the cylindrical body member is slidable along the support rod.

6. The filter insert of claim 1, wherein the cylindrical body member is held stationary to the support rod via at least one of friction fit, an adhesive, or a fastener.

7. The filter insert of claim 1, wherein the fins include four fins, and the fins are spaced about 90° apart from each other.

8. The filter insert of claim 1, further including a cap coupled to the second end of the filter tube to prevent fluid flow through the second end of the filter tube.

9. The filter insert of claim 8, wherein the support rod extends through an opening in the cap.

10. The filter insert of claim 1, further including an o-ring seal coupled to an outer peripheral edge of the debris shield.

11. The filter insert of claim 1, wherein the filter tube is constructed of pleated filter material.

12. The filter insert of claim 1, wherein the filter tube is constructed of metal.

13. The filter insert of claim 1, wherein the filter tube is to filter out particles of at least twenty microns in size.

14. A method comprising:
removing a cap from an end of a pipe;
inserting a filter insert into the pipe, the filter insert including:
- a debris shield having an opening, the debris shield sized to substantially fill the pipe;
- a filter tube having a first end, a second end, and a first channel between the first and second ends, the first end coupled to the debris shield;
- a support rod in the first channel of the filter tube;
- a cylindrical body member having a second channel, the support rod extending through the second channel of the cylindrical body member; and
- fins coupled to and extending radially outward from the cylindrical body member and engaged with an inner surface of the filter tube that defines the first channel, the fins to align the first channel of the filter tube with the opening in the debris shield; and after the filter insert is inserted into the pipe, connecting the cap to the end of the pipe.

15. The method of claim 14, further including cleaning or replacing the filter insert after a threshold pressure drop occurs across the filter insert.

16. The method of claim 14, further including, prior to inserting the filter tube into the pipe, inserting a pipeline inspection gauge into the pipe.

17. The method of claim 16, further including launching the pipeline inspection gauge.

18. The method of claim 14, further including, prior to inserting the filter tube into the pipe, closing a valve to prevent fluid flow through the pipe.

19. A filter insert to be disposed in a pipe, the filter insert comprising:
a debris shield having an opening;
a filter tube having a first end, a second end, and a channel between the first and second ends, the first end coupled to the debris shield;
a support rod in the channel of the filter tube; and
fins extending radially outward from the support rod and engaged with an inner surface of the filter tube that defines the channel, the fins to align the channel of the filter tube with the opening in the debris shield, and a diameter of an area created by the fins is larger than a diameter of the opening of the debris shield.

20. The filter insert of claim 19, wherein the fins terminate at the debris shield.

21. The filter insert of claim 19, wherein the debris shield defines a rear side, and the fins are engaged with the rear side of the debris shield.

* * * * *